United States Patent
Byeon

(10) Patent No.: US 10,897,169 B2
(45) Date of Patent: Jan. 19, 2021

(54) FAN MOTOR AND VEHICLE COMPRISING SAME

(71) Applicant: LG INNOTEK CO., LTD., Seoul (KR)

(72) Inventor: Dae Gil Byeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 131 days.

(21) Appl. No.: 16/319,244

(22) PCT Filed: Jul. 19, 2017

(86) PCT No.: PCT/KR2017/007762
§ 371 (c)(1),
(2) Date: Jan. 18, 2019

(87) PCT Pub. No.: WO2018/016870
PCT Pub. Date: Jan. 25, 2018

(65) Prior Publication Data
US 2020/0244122 A1 Jul. 30, 2020

(30) Foreign Application Priority Data

Jul. 21, 2016 (KR) .................. 10-2016-0092828

(51) Int. Cl.
*H02K 1/27* (2006.01)
*H02K 7/14* (2006.01)
(Continued)

(52) U.S. Cl.
CPC ....... *H02K 1/2786* (2013.01); *F04D 25/0613* (2013.01); *H02K 7/14* (2013.01);
(Continued)

(58) Field of Classification Search
CPC ......... H02K 1/2786; H02K 5/165; H02K 7/14
(Continued)

(56) References Cited

U.S. PATENT DOCUMENTS

| | | | |
|---|---|---|---|
| 2006/0119198 A1 | 6/2006 | Chio | |
| 2008/0036313 A1* | 2/2008 | Jiang | H02K 1/2786 310/46 |

(Continued)

FOREIGN PATENT DOCUMENTS

| | | |
|---|---|---|
| CN | 2636491 | 8/2004 |
| CN | 1821598 | 8/2006 |

(Continued)

OTHER PUBLICATIONS

European Search Report dated Feb. 14, 2020 issued in Application No. 17831343.3.
(Continued)

*Primary Examiner* — John K Kim
*Assistant Examiner* — Minki Chang
(74) *Attorney, Agent, or Firm* — KED & Associates, LLP

(57) ABSTRACT

Provided herein is a fan motor including a rotating shaft, a stator including hole in which the rotating shaft is disposed, a rotor disposed outside the stator, a fan coupled to the rotating shaft, and a housing in which the stator and the rotor is disposed, wherein the rotor includes a yoke and a first magnet coupled to the yoke, and the fan motor further includes a magnetic fluid disposed between the first magnet and the stator. The magnetic fluid is filled in a gap between the stator and the magnet of the rotor and keeps the inside of the motor airtight, thereby having an advantageous effect of preventing introduction of salt water or foreign substances into the motor.

18 Claims, 7 Drawing Sheets

(51) Int. Cl.
*F04D 25/06* (2006.01)
*F04D 25/08* (2006.01)
*H02K 9/06* (2006.01)

(52) U.S. Cl.
CPC .......... *F04D 25/08* (2013.01); *F05D 2260/95* (2013.01); *H02K 9/06* (2013.01); *H02K 2211/03* (2013.01)

(58) Field of Classification Search
USPC .................................................. 310/156.01
See application file for complete search history.

(56) References Cited

U.S. PATENT DOCUMENTS

| | | | | |
|---|---|---|---|---|
| 2009/0134719 | A1* | 5/2009 | Tomsic | H02K 1/02 310/11 |
| 2013/0009494 | A1* | 1/2013 | Oguma | F04D 25/064 310/43 |
| 2013/0193647 | A1 | 8/2013 | Honda | |
| 2016/0264028 | A1 | 9/2016 | Kawashima et al. | |
| 2016/0348894 | A1* | 12/2016 | Horng | F21V 29/773 |
| 2017/0033649 | A1* | 2/2017 | Goto | H02K 15/165 |
| 2018/0337567 | A1* | 11/2018 | Yamasaki | F04D 25/0613 |

FOREIGN PATENT DOCUMENTS

| | | |
|---|---|---|
| CN | 201714985 | 1/2011 |
| CN | 103180643 | 6/2013 |
| CN | 204408082 | 6/2015 |
| JP | 2004-023927 | 1/2004 |
| JP | 2015-081520 | 4/2015 |
| JP | 2015-089234 | 5/2015 |
| KR | 10-0611006 | 8/2006 |
| WO | WO0043698 | 9/2001 |
| WO | WO 2015/059893 | 4/2015 |

OTHER PUBLICATIONS

Chinese Office Action dated Jan. 16, 2020 issued in Application No. 201780045175.6.
International Search Report (with English Translation) and Written Opinion dated Oct. 24, 2017 issued in Application No. PCT/KR2017/007762.
Chinese Office Action dated Sep. 27, 2020 issued in Application No. 201780045175.6.

* cited by examiner

FAN MOTOR AND VEHICLE COMPRISING SAME

CROSS-REFERENCE TO RELATED PATENT APPLICATIONS

This application is a U.S. National Stage Application under 35 U.S.C. § 371 of PCT Application No. PCT/KR2017/007762, filed Jul. 19, 2017, which claims priority to Korean Patent Application No. 10-2016-0092828, filed Jul. 21, 2016, whose entire disclosures are hereby incorporated by reference.

TECHNICAL FIELD

Embodiments relate to a fan motor and a vehicle including the same.

BACKGROUND ART

A fan motor is an air blowing device in which a blade is coupled to a rotor to supply or discharge air. The fan motor includes the rotor, a stator, and the blade, and the rotor is installed outside the stator. Also, a coil forming a rotating magnetic field may be wound around the stator and cause an electrical interaction with the rotor to induce rotation of the rotor. When the rotor rotates, the blade coupled to the rotor rotates.

A housing of the fan motor includes a rotor, a stator, and a fan disposed therein. However, a blowhole is implemented in the housing of the fan motor, and thus the housing is in an open state. Consequently, there is a problem in that moisture containing salt (hereinafter referred to as salt water) permeates through the housing and causes corrosion of the rotor or stator including a magnet.

DISCLOSURE

Technical Problem

Accordingly, embodiments are for solving the above-described problem, and an object of the present invention is to provide a fan motor, which is capable of preventing introduction of salt water, and a vehicle including the same.

Objects of the present invention are not limited to that mentioned above, and other objects not mentioned herein should be clearly understood by those of ordinary skill in the art from the description below.

Technical Solution

To achieve the above object, a fan motor according to an embodiment includes a rotating shaft, a stator including a hole in which the rotating shaft is disposed, a rotor disposed outside the stator, a fan coupled to the rotating shaft, and a housing in which the stator and the rotor are disposed, wherein the rotor includes a yoke and a first magnet coupled to the yoke, and the fan motor further includes a magnetic fluid disposed between the first magnet and the stator.

The magnetic fluid may be applied on a lower end of the first magnet.

The yoke may include a scattering preventer which extends by being bent from a lower end of the yoke toward the rotating shaft.

An upper surface of the scattering preventer and a lower surface of the first magnet may come into surface contact.

The housing may include a columnar portion protruding upward in a cylindrical shape from a lower surface of the housing and having an inner circumferential surface, and the columnar portion may be disposed between the rotating shaft and the stator.

The fan may include a hub configured to be coupled to the rotating shaft and the rotor, the yoke of the rotor may be disposed between the hub and the stator, and the first magnet of the rotor may be disposed between the yoke and the stator.

To achieve the above object, a fan motor according to another embodiment includes a rotating shaft, a stator including a hole in which the rotating shaft is disposed, a rotor disposed outside the stator, a fan coupled to the rotating shaft, and a housing in which the stator and the rotor are disposed, wherein the rotor includes a yoke and a first magnet coupled to the yoke, a second magnet is disposed in at least one of the fan or the housing, and the fan motor further includes a magnetic fluid disposed on the second magnet.

The second magnet may be coupled to the fan so that a portion of a surface of the second magnet is exposed to the outside.

The housing may include a bottom surface facing a lower end of the fan motor, and the second magnet may be coupled to a lower end of the fan so that the exposed surface of the second magnet faces the bottom surface of the housing.

The housing may include a bottom surface facing a lower end of the fan motor, and the second magnet may be coupled to the bottom surface of the housing so that a portion of a surface of the second magnet is exposed to the outside.

The housing may further include a scattering preventer protruding from the bottom surface toward the rotating shaft.

The scattering preventer may be disposed between the outside of the fan and the second magnet with respect to the center of the rotating shaft.

The scattering preventer may protrude upward from the bottom surface of the housing in a circumferential direction with respect to the center of the rotating shaft.

The second magnet may be disposed within a radius of the fan with the rotating shaft as the center.

The magnetic fluid may partially overlap with the rotating shaft in a direction of the rotating shaft.

To achieve the above object, a vehicle according to an embodiment includes a fan motor including a rotating shaft, a stator including a hole in which the rotating shaft is disposed, a rotor disposed outside the stator, a fan coupled to the rotating shaft, and a housing in which the stator and the rotor are disposed, wherein the rotor includes a yoke and a first magnet coupled to the yoke, and the fan motor further includes a magnetic fluid disposed between the first magnet and the stator.

Advantageous Effects

According to embodiments, by a magnetic fluid being filled in a gap between a stator and a magnet of a rotor and thus keeping the inside of a motor airtight, there is an advantageous effect in that introduction of salt water or foreign substances into the motor is prevented.

According to embodiments, by a magnetic fluid being filled in a gap between a lower end of a fan and a bottom surface of a housing and thus keeping the inside of a motor airtight, there is an advantageous effect in that introduction of salt water or foreign substances into the motor is prevented.

MODES OF THE INVENTION

Hereinafter, exemplary embodiments of the present invention will be described in detail with reference to the accompanying drawings. Objects, specific advantages, and novel features of the present invention will become more apparent from the detailed description and exemplary embodiments below related to the accompanying drawings. Also, the terms or words used in the present specification and the claims should not be limitedly interpreted in their general or dictionary meanings but, based on the principle that an inventor may properly define concepts of terms to describe his or her invention in the best possible way, should be interpreted in meanings and concepts in accordance with the technical idea of the present invention. In addition, in describing the present invention, detailed description of a known related art that may unnecessarily obscure the gist of the present invention will be omitted.

Figure 1:
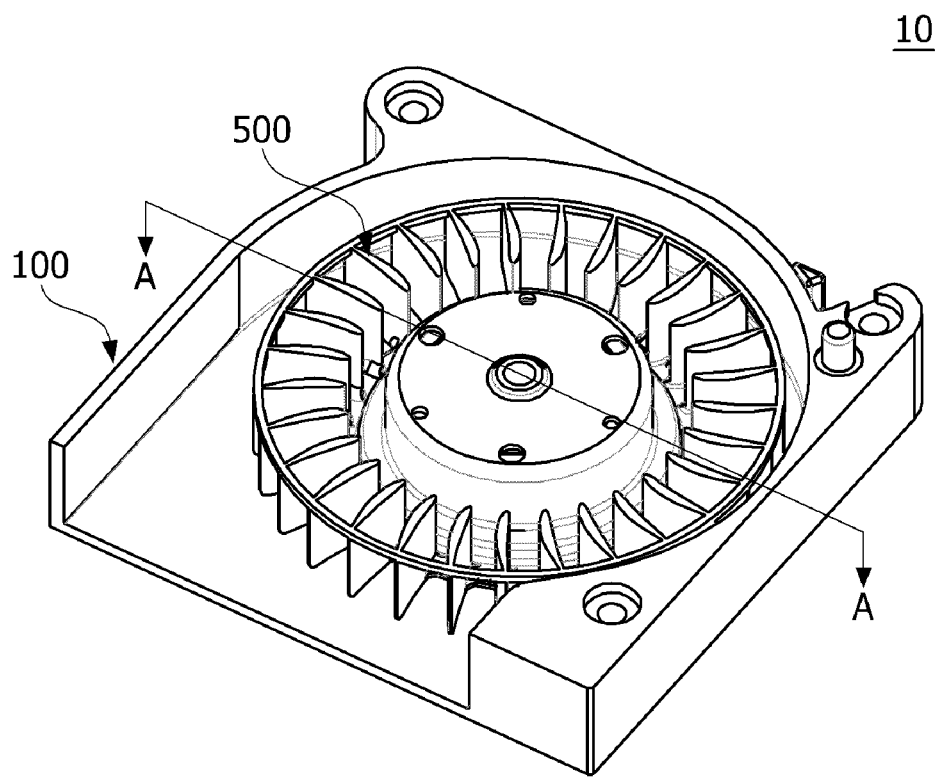
FIG. 1 is a view illustrating a fan motor according to an embodiment.
Figure 2:
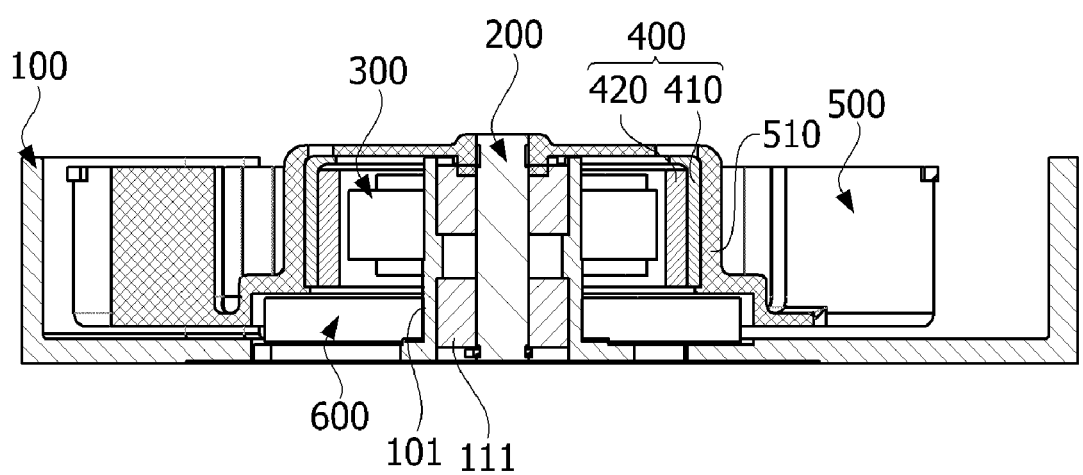
FIG. 2 is a cross-sectional view of the fan motor taken along line A-A of FIG. 1.

FIG. 1 is a view illustrating a fan motor according to an embodiment, and FIG. 2 is a cross-sectional view of the fan motor taken along line A-A of FIG. 1.

Referring to FIGS. 1 and 2, a fan motor 10 according to an embodiment may include a housing 100, a rotating shaft 200, a stator 300, a rotor 400, and a fan 500.

A blowhole configured to discharge suctioned air and a flow path corresponding thereto may be provided in the housing 100. Also, the housing 100 may include a columnar portion 101. The columnar portion 101 may be formed to vertically protrude from a bottom surface of the housing 100. Also, the columnar portion 101 may be formed to be hollow.

A bearing 111 may be installed inside the columnar portion 101.

The rotating shaft 200 is fitted to the bearing 111 and rotatably disposed inside the columnar portion 101. The rotating shaft 200 is connected to the rotor 400. Also, an upper end of the rotating shaft 200 may be connected to the fan 500.

The stator 300 may be fitted and coupled to the columnar portion 101. The stator 300 causes an electrical interaction with the rotor 400 and induces rotation of the rotor 400. To cause the electrical interaction with the rotor 400, a coil may be wound around the stator 300. A specific configuration of the stator for winding a coil is as follows.

The stator 300 may include a stator core including plurality of teeth. The stator core may have an annular yoke and teeth facing outward from the yoke. The teeth may be provided at predetermined intervals along a circumference of the yoke. Meanwhile, the stator core may be formed by stacking a plurality of plates in the form of a thin steel plate on one another.

The rotor 400 is disposed outside the stator 300. The rotor 400 may include a yoke 410 and a first magnet 420. The yoke 410 is coupled to the inside of a hub 510 of the fan 500. The first magnet 420 may be attached to an inner circumferential surface of a side portion of the yoke 410.

The hub 510 of the fan 500 is coupled to the rotating shaft 200. As the rotating shaft 200 rotates, the fan 500 rotates and blows air.

A printed circuit board 600 may be disposed below the fan 500 and coupled to the housing 100.

Figure 3:
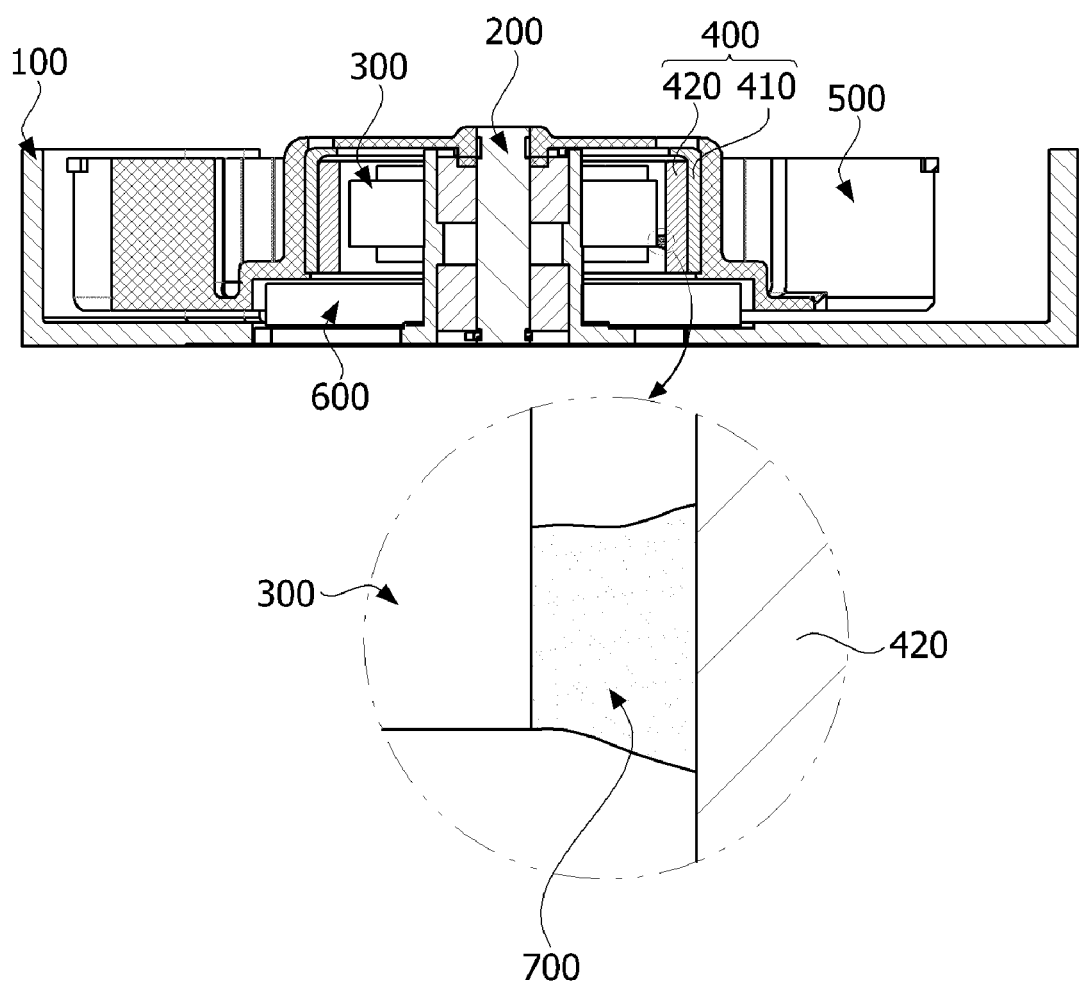
FIG. 3 is a view illustrating a fan motor according to a first modified example.
Figure 4:
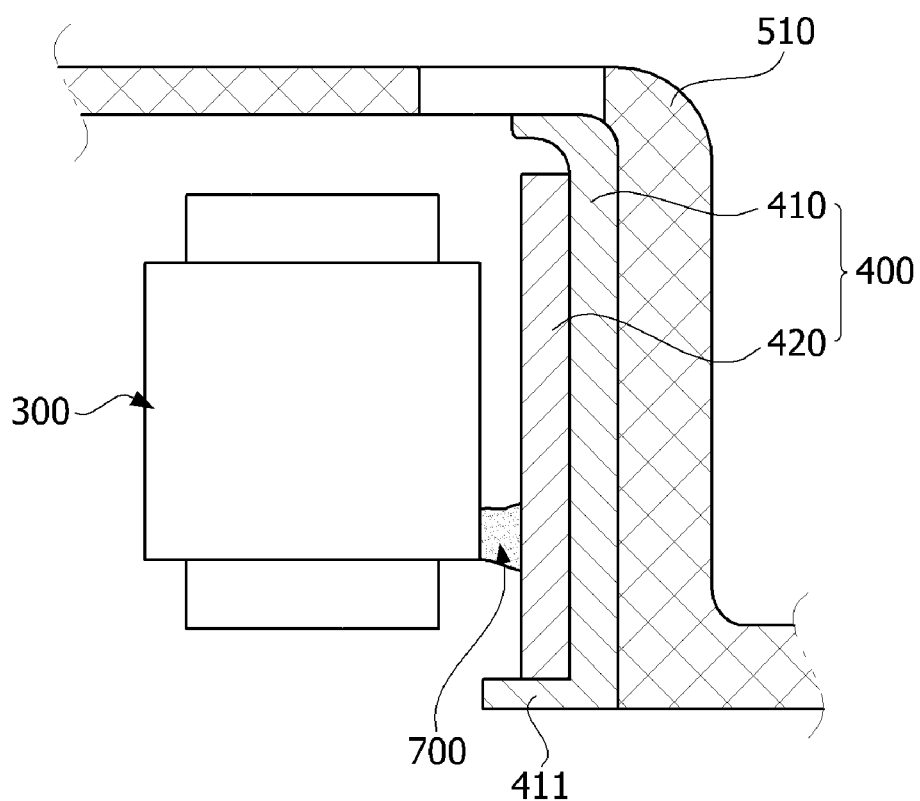
FIG. 4 is a view illustrating a magnetic fluid placed in a gap between a stator and a magnet of a rotor in the fan motor of FIG. 3.

FIG. 3 is a view illustrating a fan motor according to a first modified example, and FIG. 4 is a view illustrating a magnetic fluid placed in a gap between a stator and a magnet of a rotor in the fan motor of FIG. 3.

Referring to FIGS. 3 and 4, a magnetic fluid 700 may be applied on a first magnet 420 of a rotor 400. Magnetic fluid refers to a fluid produced by stabilizing and dispersing magnetic powder in a colloidal shape in a liquid and then adding a surfactant to prevent precipitation or condensation.

The magnetic fluid 700 may be applied on a lower end of the first magnet 420. This is to effectively block introduction of salt water because a gap between the lower end of the first magnet 420 and a stator 300 may become an inlet through which sat water is introduced.

Because the gap between the stator 300 and the first magnet 420 is very small, when the magnetic fluid 700 is applied on a surface of the first magnet 420, the magnetic fluid 700 fills the gap between the lower end of the first magnet 420 and the stator 300 and thus blocks introduction of salt water or foreign substances into the fan motor.

Referring to FIG. 4, a yoke 410 may include a scattering preventer 411. The scattering preventer 411 may be formed to extend by being bent inward from a lower end of the yoke 410. Such a scattering preventer 411 serves to physically prevent scattering of the magnetic fluid 700, which is placed in the gap between the stator 300 and the lower end of the first magnet 420, to the outside of the yoke 410 due to rotation of the rotor 400.

Figure 5:
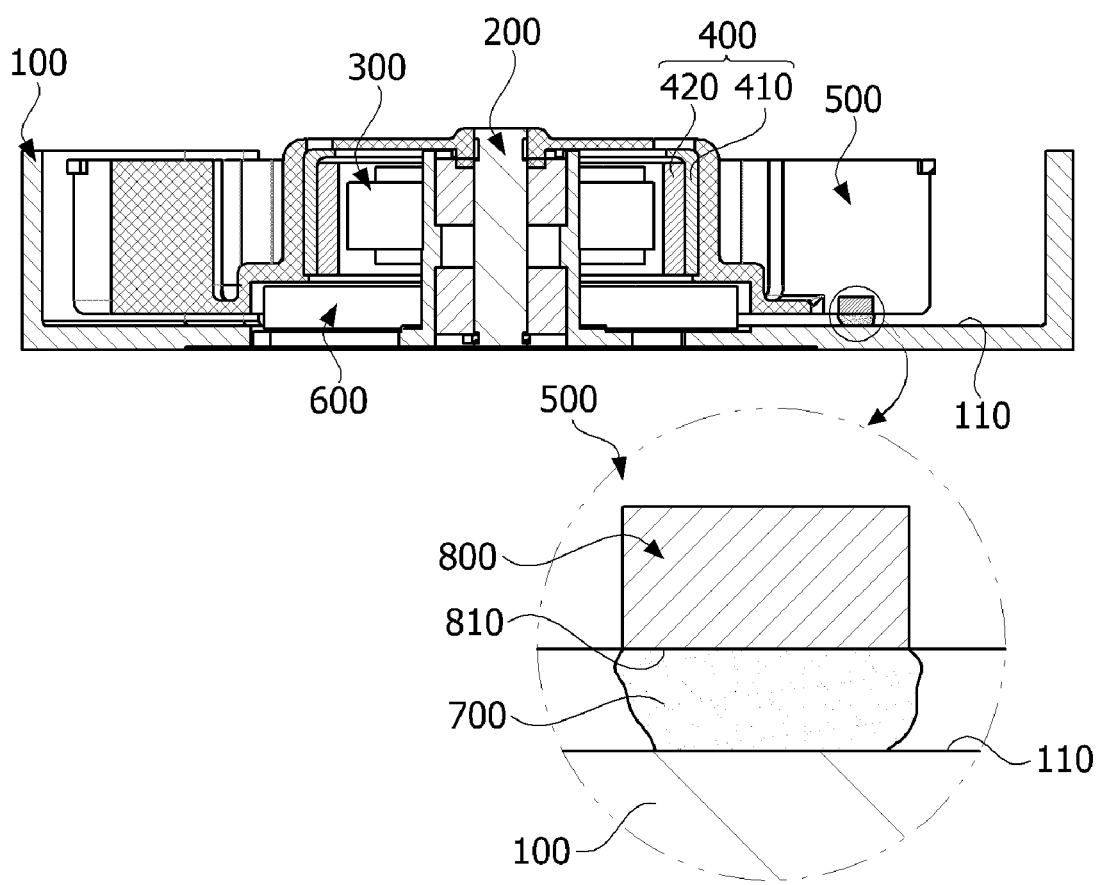
FIG. 5 is a view illustrating a fan motor according to a second modified example.
Figure 6:
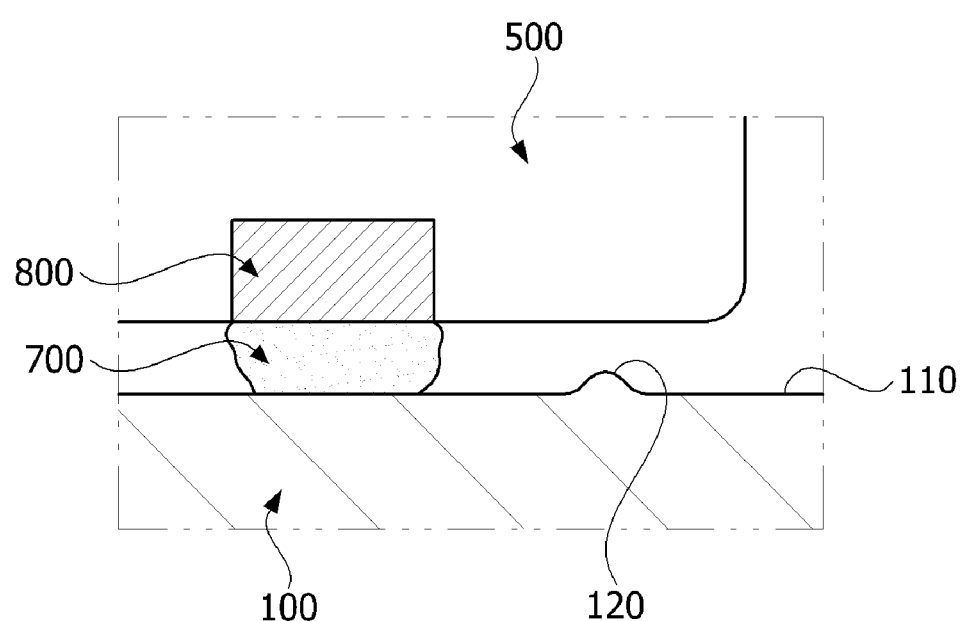
FIG. 6 is a view illustrating a magnetic fluid placed in a gap between the bottom of a housing and a magnet of a fan in the fan motor of FIG. 5.

FIG. 5 is a view illustrating a fan motor according to a second modified example, and FIG. 6 is a view illustrating a magnetic fluid placed in a gap between the bottom of a housing and a magnet of a fan in the fan motor of FIG. 5.

Referring to FIGS. 5 and 6, a separate second magnet 800 may be installed at a lower end of a wing of a fan 500. In this case, the second magnet 800 may be installed at the wing of the fan 500 so that a portion 810 of a surface of the second magnet 800 is exposed. The exposed portion 810 of the surface of the second magnet 800 faces a bottom surface 110 of a housing 100. The second magnet 800 may be integrally formed with the fan 500 by insert molding. The second magnet 800 may be installed at every wing of the fan 500.

A magnetic fluid 700 is applied on the exposed portion 810 of the surface of the second magnet 800. Because a gap between the bottom surface 110 of the housing 100 and the second magnet 800 is very small, when the magnetic fluid 700 is applied on the surface of the second magnet 800, the magnetic fluid 700 fills the gap between the second magnet 800 and the bottom surface 110 of the housing 100 and thus blocks introduction of salt water or foreign substances into the fan motor.

Referring to FIG. 6, the housing 100 may include a scattering preventer 120. The scattering preventer 120 protrudes from the bottom surface 110 of the housing 100 and is placed between the second magnet 800 and an outer boundary of the fan 500 with respect to a radial direction. Such a scattering preventer 120 may be formed in a circumferential direction about a rotating shaft 200 (see FIG. 5).

Such a scattering preventer 120 physically prevents scattering of the magnetic fluid 700, which is placed in the gap between the second magnet 800 and the bottom surface 110 of the housing 100, to the outside of the fan 500 due to rotation of the rotor 400.

Figure 7:
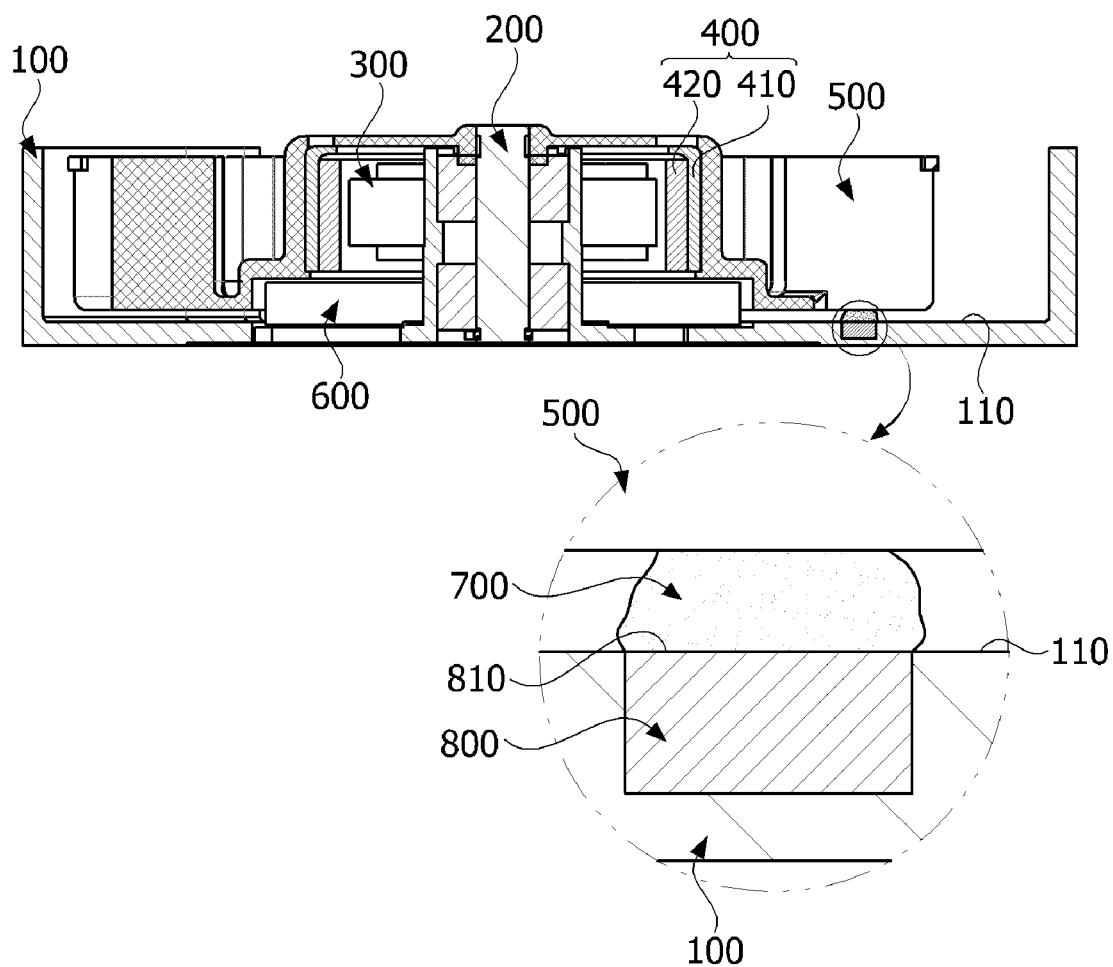
FIG. 7 is a view illustrating a fan motor according to a third modified example.
Figure 8:
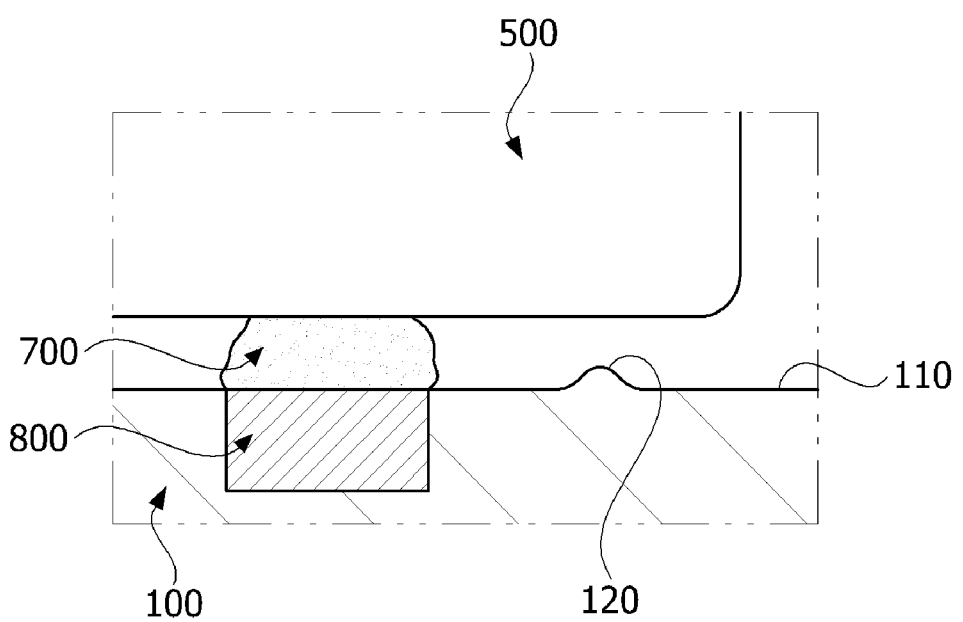
FIG. 8 is a view illustrating a magnetic fluid placed in a gap between a magnet of a housing and a lower end of a fan in the fan motor of FIG. 7.

FIG. 7 is a view illustrating a fan motor according to a third modified example, and FIG. 8 is a view illustrating a magnetic fluid placed in a gap between a magnet of a housing and a lower end of a fan in the fan motor of FIG. 7.

Referring to FIGS. 7 and 8, a separate second magnet 800 may be installed at a bottom surface 110 of a housing 100. In this case, the second magnet 800 may be installed at the bottom surface 110 of the housing 100 so that a portion 810 of a surface of the second magnet 800 is exposed. The exposed portion 810 of the surface of the second magnet 800 faces a lower end of a fan 500. The second magnet 800 may be integrally formed with the housing 100 by insert molding. The second magnet 800 may be formed in a circumferential direction about a rotating shaft 200 (see FIG. 7). Also, the second magnet 800 is disposed within a radius of the fan 500 in a radial direction about the rotating shaft 200 (see FIG. 7).

A magnetic fluid 700 is applied on the exposed portion 810 of the surface of the second magnet 800. Because a gap between the bottom surface 110 of the housing 100 and the second magnet 800 is very small, when the magnetic fluid 700 is applied on the surface of the second magnet 800, the magnetic fluid 700 fills the gap between the second magnet 800 and the lower end of the fan 500 and thus blocks introduction of salt water or foreign substances into the fan motor.

Referring to FIG. 8, the housing 100 may include a scattering preventer 120. The scattering preventer 120 protrudes from the bottom surface 110 of the housing 100 and is placed between the second magnet 800 and an outer boundary of the fan 500 with respect to a radial direction. Such a scattering preventer 120 may be formed in a circumferential direction about a rotating shaft 200 (see FIG. 7).

Such a scattering preventer 120 physically prevents scattering of the magnetic fluid 700, which is placed in the gap between the second magnet 800 and the lower end of the fan 500, to the outside of the fan 500 due to rotation of the rotor 400.

The fan motor and vehicle including the same according to one exemplary embodiment of the present invention have been described in detail above with reference to the accompanying drawings.

The above description is merely illustrative of the technical idea of the present invention. Those of ordinary skill in the art to which the present invention pertains should be able to make various modifications, changes, and substitutions within the scope not departing from essential characteristics of the present invention. Therefore, the embodiments disclosed herein and the accompanying drawings are for describing, instead of limiting, the technical idea of the present invention, and the scope of the technical idea of the present invention is not limited by the embodiments and the accompanying drawings. The scope of the present invention should be interpreted on the basis of the claims below, and all technical ideas within the equivalent scope should be interpreted as belonging to the scope of the present invention.

DESCRIPTION OF REFERENCE NUMERALS

10: fan motor, 100: housing, 101: columnar portion, 110: bottom surface, 120, 411: scattering preventer, 200: rotating shaft, 300: stator, 400: rotor, 410: yoke, 420: first magnet, 500: fan, 600: printed circuit board, 700: magnetic fluid, 800: second magnet.

The invention claimed is:

1. A fan motor comprising:
    a rotating shaft;
    a stator including a hole in which the rotating shaft is disposed;
    a rotor disposed outside the stator;
    a fan coupled to the rotating shaft; and
    a housing in which the stator and the rotor are disposed,
    wherein the rotor includes a yoke and a first magnet coupled to the yoke,
    the fan motor further comprising a magnetic fluid disposed between the first magnet and the stator,
    wherein the magnetic fluid is disposed on a lower end of the first magnet, and
    wherein the yoke includes a scattering preventer which extends by being bent from a lower end of the yoke toward the rotating shaft.

2. The fan motor of claim 1, wherein the scattering preventer partially overlaps with the magnetic fluid in a direction of the rotating shaft.

3. The fan motor of claim 1, wherein the scattering preventer is protruded more than the first magnet toward the rotation axis.

4. The fan motor of claim 1, wherein an upper surface of the scattering preventer and a lower surface of the first magnet come into surface contact.

5. The fan motor of claim 1, wherein:
    the housing includes a columnar portion protruding upward in a cylindrical shape from a lower surface of the housing and having an inner circumferential surface; and
    the columnar portion is disposed between the rotating shaft and the stator.

6. The fan motor of claim 5, wherein:
    the fan includes a hub configured to be coupled to the rotating shaft and the rotor;
    the yoke of the rotor is disposed between the hub and the stator; and
    the first magnet of the rotor is disposed between the yoke and the stator.

7. A fan motor comprising:
    a rotating shaft;
    a stator including a hole in which the rotating shaft is disposed;
    a rotor disposed outside the stator;
    a fan coupled to the rotating shaft; and
    a housing in which the stator and the rotor are disposed, wherein:
    the rotor includes a yoke and a first magnet coupled to the yoke; and
    a second magnet is disposed in at least one of the fan or the housing,
    the fan motor further comprising a magnetic fluid disposed on the second magnet, wherein the housing further includes a scattering preventer protruding from a bottom surface toward the rotating shaft, and wherein the scattering preventer is disposed between the outside of the fan and the second magnet in the radial direction at the center of the rotation axis.

8. The fan motor of claim 7, wherein the second magnet is coupled to the fan so that a portion of a surface of the second magnet is exposed to the outside.

9. The fan motor of claim 8, wherein:
the housing includes the bottom surface facing a lower end of the fan motor; and
the second magnet is coupled to a lower end of the fan so that the exposed surface of the second magnet faces the bottom surface of the housing.

10. The fan motor of claim 8, wherein the scattering preventer is disposed below the fan, and is spaced apart from the fan in the direction of the rotation axis.

11. The fan motor of claim 10, wherein the scattering preventer protrudes upward from the bottom surface of the housing in a circumferential direction with respect to the center of the rotating shaft.

12. The fan motor of claim 7, wherein:
the housing includes the bottom surface facing a lower end of the fan motor; and
the second magnet is coupled to the bottom surface of the housing so that a portion of a surface of the second magnet is exposed to the outside.

13. The fan motor of claim 12, wherein the uppermost end of the scattering preventer is disposed higher than the exposed surface of the second magnet.

14. The fan motor of claim 12, the scattering preventer is disposed below the fan, and is spaced apart from the fan in the direction of the rotation axis.

15. The fan motor of claim 14, wherein the scattering preventer protrudes upward from the bottom surface of the housing in a circumferential direction with respect to the center of the rotating shaft.

16. The fan motor of claim 7, wherein the second magnet is disposed within a radius of the fan with the rotating shaft as the center.

17. The fan motor of claim 16, wherein the magnetic fluid partially overlaps with the second magnet in a direction of the rotating shaft.

18. A vehicle comprising a fan motor, the fan motor comprising:
a rotating shaft;
a stator including a hole in which the rotating shaft is disposed;
a rotor disposed outside the stator;
a fan coupled to the rotating shaft; and
a housing in which the stator and the rotor are disposed,
wherein the rotor includes a yoke and a first magnet coupled to the yoke,
the fan motor further comprising a magnetic fluid disposed between the first magnet and the stator,
wherein the magnetic fluid is disposed on a lower end of the first magnet, and
wherein the yoke includes a scattering preventer which extends by being bent from a lower end of the yoke toward the rotating shaft.

* * * * *